Figures 1, 2, 3:
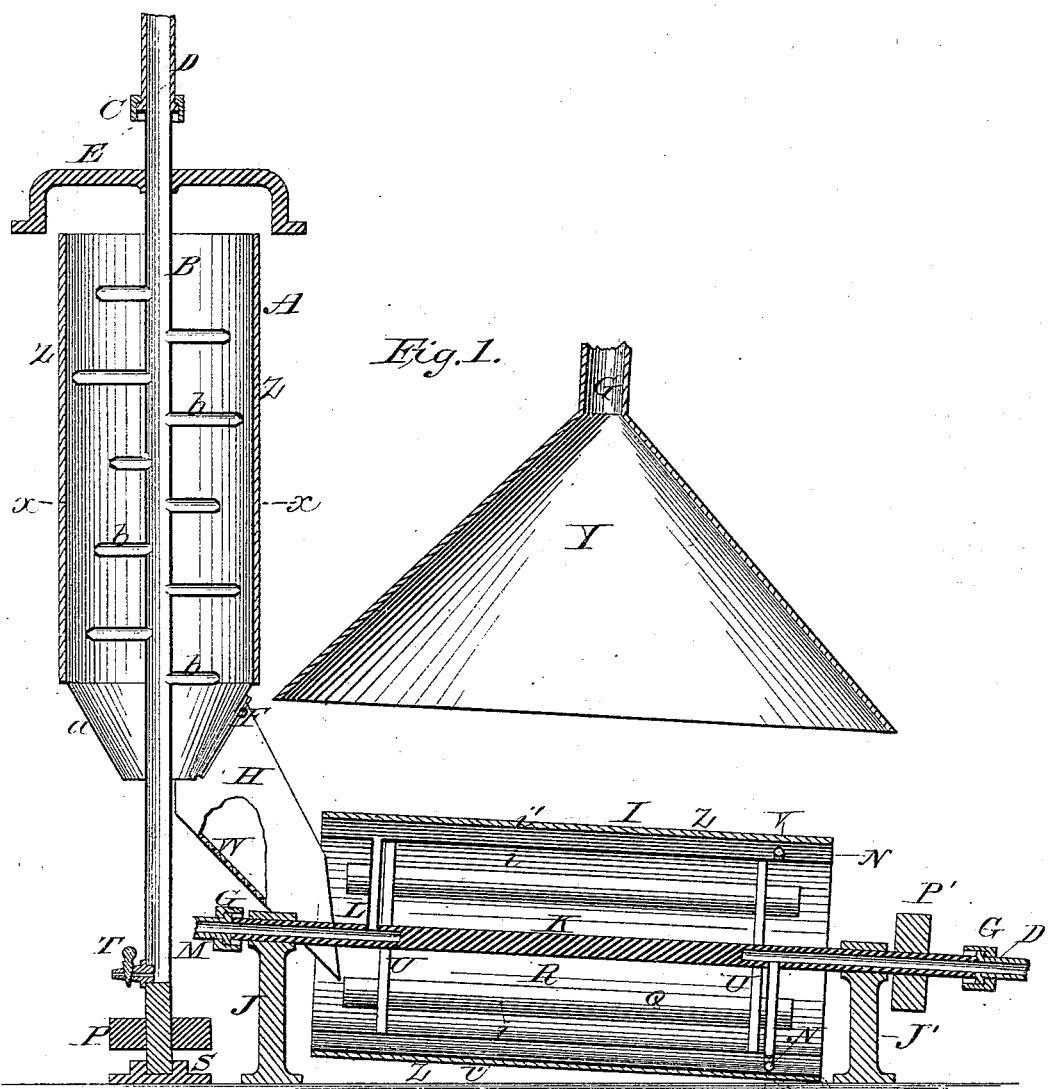

H. C. HOWARD.
Apparatus for Cooking and Drying Grain by Steam.

No. 226,172. Patented April 6, 1880.

Witnesses:
Lyman Row
Michael Mulvy

Inventor:
Henry C. Howard

UNITED STATES PATENT OFFICE.

HENRY C. HOWARD, OF TOLEDO, OHIO.

APPARATUS FOR COOKING AND DRYING GRAIN BY STEAM.

SPECIFICATION forming part of Letters Patent No. 226,172, dated April 6, 1880.

Application filed September 25, 1879.

*To all whom it may concern:*

Be it known that I, HENRY C. HOWARD, of the city of Toledo, county of Lucas, and State of Ohio, have invented a new and useful Improvement in Devices for Preparing Cereals for Food for Animals, of which the following is a specification.

My invention relates to that class of devices which are used for the steaming, cooking, and drying of cereals for food.

The object of my invention is to provide a device by means of which cereals may be rapidly steamed, cooked, and dried in such a manner as to thoroughly liberate all of the nutritive properties of the grain; and it consists in a device operated by steam or other power, by which cereals are brought in direct contact with steam and thoroughly cooked, and then subjected to a dry heat, which prepares them for grinding and storage, the whole operation of which makes the cereals more nutritive and more profitable for food.

The advantages of my invention over other methods of preparing cereals are the perfect distribution of the steam through the body of cereals being cooked by means of a revolving steam shaft or cylinder, having attached to it projecting pipes of unequal length, which thoroughly distribute the steam by their revolving motion through the mass, thus doing the work of cooking quicker and better, and the drainage of all the water from the cooked cereals before they pass into the drier, and the rapid collection and carrying off of all the steam rising from the drier. The steam cylinder or shell also has a large area of heating-surface, by means of which the cereals placed on the inside and constantly agitated by the rotation are very rapidly dried, the whole of which may be more fully understood by reference to the accompanying drawings, which are hereby made part of this specification, like letters referring to like parts in each figure.

Figure 1 represents a vertical longitudinal section of the steaming-cylinder and its parts in connection with the drying-cylinder and its parts. Fig. 2 represents a cross-section of the steaming-cylinder and its parts on the line X X. Fig. 3 represents a cross-section of the drying-cylinder and its parts on the line V V.

In Fig. 1, A represents a cylindrical hopper, having a conical bottom, $a$, into which the cereals are introduced for steaming and cooking. B is a hollow shaft passing through the center of the cylindrical hopper A and through an aperture in its conical bottom $a$, the lower end of which shaft is solid and rests in a step-box, S. In that part of the hollow shaft B which is within the cylindrical hopper A small pipes $b\ b\ b$, of any number or size and of varied lengths, are inserted. The outer ends of these are flattened, forming a small slot-like opening for the passage of the steam into the cereals. Above the cylindrical hopper A is an arm, E, forming a box and support for hollow shaft B. Above the arm E hollow shaft B terminates in a coupling, C, by means of which a pipe, D, is attached for the conveying of steam into hollow shaft B above step-box S. On the solid part of hollow shaft B is a pulley, P, and above pulley P is a cock, T, to carry off the water from hollow shaft B. From the hollow shaft B the steam passes through the small pipes $b\ b\ b$ and through the small slot-like opening at their outer ends into the cereals contained in the cylindrical hopper A.

The hollow shaft B is rotated by means of power applied to pulley P, and thus the hollow shaft B, with the small pipes $b\ b\ b$ attached, being so revolved, causes the cereals to be continually agitated, and the small pipes $b\ b\ b$ being of different lengths, the steam is brought into direct contact with the contents of the cylindrical hopper A.

F is a gate in the conical bottom $a$, through which the cereals, after being sufficiently cooked, are permitted to pass out into the chute H, which is provided with a perforated bottom to drain off the water before they pass into the drier. I is a double cylinder, consisting of an outer one, $i'$, and an inner one, $i$. The two are joined together on the ends, so as to make a complete steam-tight apartment. K is a hollow shaft, with a partition to separate the live from the exhaust steam. The hollow shaft K is fixed in the center of the double cylinder I by means of the spiders U U. L is a pipe to convey the live steam from the hollow shaft K into the double cylinder I. N is a coil of pipe terminating in a large funnel-shaped opening, which takes up the exhaust steam and water and carries it out into the hollow shaft K. G G are couplings on each end of the hollow shaft K, which connect it with the feed and drain pipes. J J' are hangers which support the shaft K. P' is a pulley on the shaft K, by means of which it is rotated. Q Q Q are buckets on the interior of the inner cylinder, $i$, to carry up and agitate the cereals while being dried. O is a second chute to convey away the dried cereals. Z Z is a casing, of wood or other non-conducting material, around the double cylinder I, to retain the heat in the same, the cylindrical hopper A being incased also in the same manner.

The steamed cereals passing into the chamber R of the drier and the cylinder being revolved, they are continually agitated by means of the buckets Q, and the slight inclination of the cylinder carries them through as they become drier, until they pass out dry into the chute O. A flue, terminating in a large conical opening below, is placed directly over and near to the cylinder I and chute H, to collect and carry off all steam rising therefrom.

What I claim as new, and desire to secure by Letters Patent, is—

1. In an apparatus for cooking cereals, cylindrical hopper A, with conical bottom $a$, opening F, chute H, and casing Z Z, shaft B, with small pipes $b\ b\ b$, of various lengths, arm E, coupling C, pipe D, cock T, pulley P, and step S, substantially as and for the purpose specified.

2. In an apparatus for cooking and drying cereals, the combination of the cylindrical hopper A and shaft B with the various parts connected therewith, as specified, and the double cylinder I and shaft K, with all the various parts connected therewith, as specified, all substantially as and for the purpose specified.

HENRY C. HOWARD.

Witnesses:
JOHN R. KIRKUP,
CHAS. L. RHOADES.